United States Patent
Herzog et al.

(10) Patent No.: US 10,948,085 B2
(45) Date of Patent: Mar. 16, 2021

(54) GAP SECONDARY SEAL SUPPORT TEMPLATE

(71) Applicants: Jan Herzog, Lexington Park, MD (US); Loyd Broom, Middleburg, FL (US)

(72) Inventors: Jan Herzog, Lexington Park, MD (US); Loyd Broom, Middleburg, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 221 days.

(21) Appl. No.: 16/401,514

(22) Filed: May 2, 2019

(65) Prior Publication Data
US 2020/0347938 A1    Nov. 5, 2020

(51) Int. Cl.
*F16J 15/34* (2006.01)
(52) U.S. Cl.
CPC ................. *F16J 15/3464* (2013.01)
(58) Field of Classification Search
CPC .. F16J 15/3464; F16J 15/3296; F16J 15/3472; F16J 15/348; F16J 15/3268
See application file for complete search history.

(56) References Cited

U.S. PATENT DOCUMENTS

| | | | |
|---|---|---|---|
| 2003/0230134 A1* | 12/2003 | Gammon | G01N 3/56 73/7 |
| 2010/0106429 A1* | 4/2010 | Horak | F16J 15/3492 702/34 |

* cited by examiner

*Primary Examiner* — Gilbert Y Lee
(74) *Attorney, Agent, or Firm* — Mark O. Glut; NAWCAD

(57) ABSTRACT

A secondary seal support template gauge, for determining whether a secondary seal support 50 is distorted, includes a plate, rectangular downward projections, and a rectangular finger. The plate has a first end and a second end, and has apertures that correspond to protruding screws of the secondary seal support. There are preferably two pairs of rectangular downward projections attached to the plate. The two pairs of rectangular downward projections are juxtapositioned such that, in operation, each pair of rectangular downward projections grip the secondary seal support and center the template gauge on the secondary seal support and each protruding screw enters an aperture when the secondary seal support is undistorted. The rectangular finger disposed on the second end of the plate such that, in operation, the finger can enter the support slot when the secondary seal support is undistorted.

1 Claim, 3 Drawing Sheets

GAP SECONDARY SEAL SUPPORT TEMPLATE

STATEMENT OF GOVERNMENT INTEREST

The invention described herein may be manufactured and used by or for the Government of the United States of America for governmental purposes without payment of any royalties thereon or therefor.

BACKGROUND

The United States Navy has determined that they were scrapping a large amount of secondary seal support, particularly the F414 secondary seal support. A secondary seal support typically includes protruding screws and a support slot. Currently, there is no official Navy guidance or instruction to check if there is distortion in the secondary seal supports. Therefore, the inspector of the secondary seal support must utilize their own judgement or an ad hoc method to determine if the secondary seal support is distorted. The present amount of distortion allowed on the secondary seal support is none. This resulted in many secondary seal supports being disposed, despite the fact they are still operational. Secondary seal supports are expensive. Thus, there exists a need to find a simple, fast, and consistent way to check secondary seal supports for distortion.

SUMMARY

The present invention is directed to a secondary seal support template that meets the needs listed above and below.

It is a feature of the present invention to provide a secondary seal template that is easy to use and can quickly and cheaply determine if a secondary seal support is distorted and needs to be replaced or repaired.

It is a feature of the present invention to provide a secondary seal template that is simple and consistent.

DRAWINGS

These and other features, aspects and advantages of the present invention will become better understood with reference to the following description and appended claims, and accompanying drawings wherein:

Figure 3A:
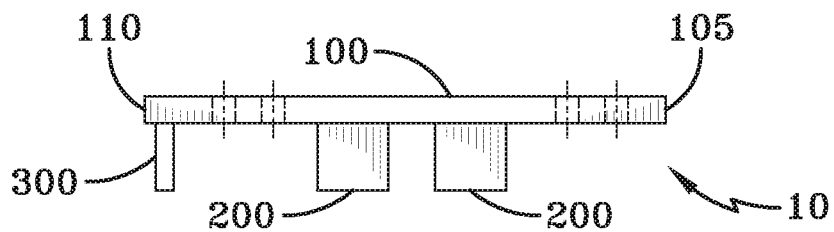
Figure 3B:
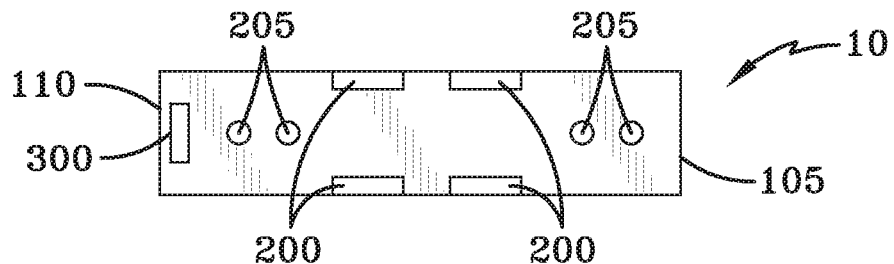
Figure 4:
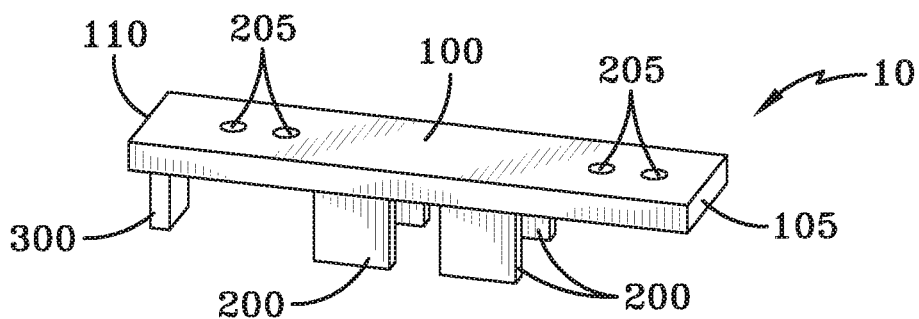
Figure 5:
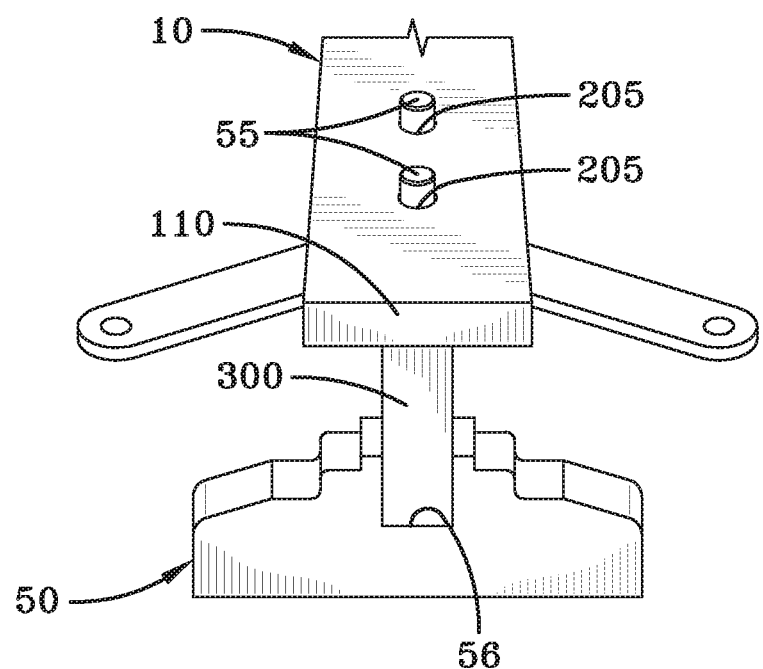

FIG. 3A a side view of the secondary seal support template gauge;

FIG. 3B a bottom view of the secondary seal support template gauge;

FIG. 4 is a different side perspective view of the secondary seal support template gauge; and, FIG. 5 is a front view of the secondary seal support template gauge in operation.

DESCRIPTION

Figure 1:
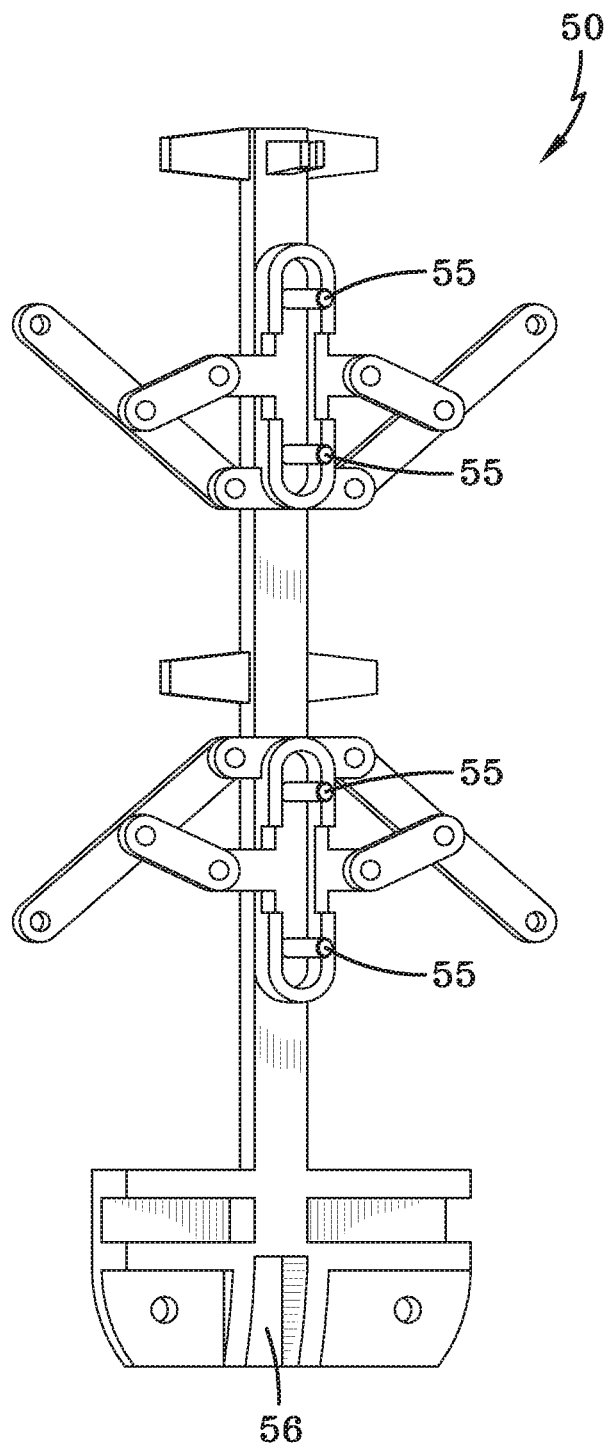
FIG. 1 is a top perspective view of an embodiment of a secondary seal support, the invention is utilized on a secondary seal support (shown for illustrative purposes only)
Figure 2:
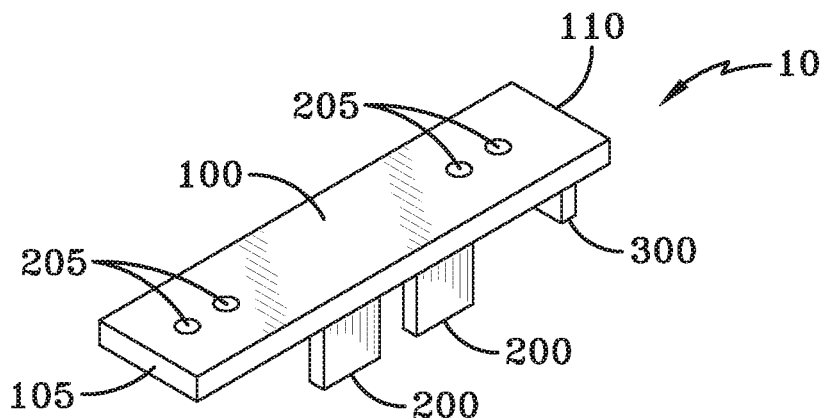
FIG. 2 is a side perspective view of the secondary seal support template gauge.

The preferred embodiments of the present invention are illustrated by way of example below and as shown in FIGS. 1-5. As shown in FIG. 1, a secondary seal support 50 includes protruding screws 55 and a support slot 56. In operation, the invention is placed on the secondary seal support 50 to determine if there is distortion in the secondary seal support 50. As shown in FIGS. 2-5, the secondary seal support template gauge 10, for determining whether a secondary seal support 50 is distorted, includes a plate 100, rectangular downward projections 200, and a rectangular finger 300. The plate 100 has a first end 105 and a second end 110, and has apertures 205 that correspond to the protruding screws 55 of the secondary seal support 50. There are preferably two pairs of rectangular downward projections 200 attached to the plate 100. The two pairs of rectangular downward projections 200 are juxtapositioned such that, in operation, each pair of rectangular downward projections 200 grip the secondary seal support 50 and center the template gauge 10 on the secondary seal support 50 and each protruding screw 55 enters an aperture 205 when the secondary seal support 50 is undistorted. The rectangular finger 300 disposed on the second end 110 of the plate 100 such that, in operation, the finger 300 can enter the support slot 56 when the secondary seal support 50 is undistorted. FIG. 5 shows the secondary seal support template gauge 10 in operation and placed on a secondary seal support 50.

This invention, in particular, can be utilized on the F/A-18 aircraft, but can be reconfigured and used on other military or civilian use platform that have variable nozzles. In the description of the present invention, the invention will be discussed in a military aircraft environment; however, this invention can be utilized for any type of application that requires use of a secondary seal support.

The secondary seal support template 10 can be manufactured from metal, alloys, plastics, ceramics, or a combination thereof. The device 10 can be manufactured, but without limitation, utilizing a 3-D printer.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A secondary seal support template gauge for determining whether a secondary seal support is distorted, the secondary seal support includes protruding screws and a support slot, the template gauge comprising:

a plate having a first end and a second end, the plate having apertures that correspond to the protruding screws of the secondary seal support;

two pairs of rectangular downward projections attached to the plate, the two pairs of rectangular downward projections are juxtapositioned such that, in operation, each pair of rectangular downward projections grip the secondary seal support and center the template gauge on the secondary seal support and each protruding screw enters an aperture when the secondary seal support is undistorted; and a rectangular finger, the finger disposed on the second end of the plate such that, in operation, the finger, can enter the support slot when the secondary seal support is undistorted.

* * * * *